Figure 1:
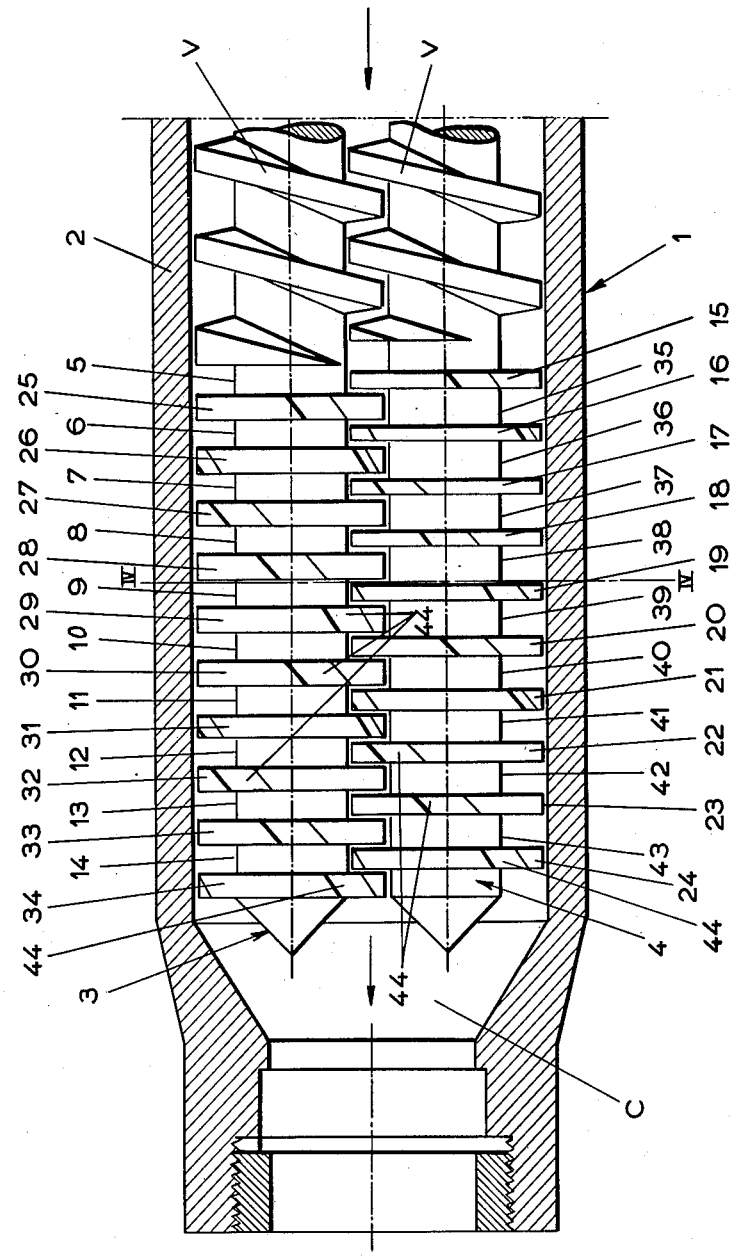

March 10, 1953   L. KRAFFE DE LAUBAREDE   2,631,016
HOMOGENIZING DEVICE FOR EXTRUDING MACHINES
Filed July 10, 1950   2 SHEETS—SHEET 1

Inventor:
Leonce Kraffe de Laubarede
By:
Emery, Holcombe & Blair
Attorneys

March 10, 1953 — L. KRAFFE DE LAUBAREDE — 2,631,016
HOMOGENIZING DEVICE FOR EXTRUDING MACHINES
Filed July 10, 1950 — 2 SHEETS—SHEET 2

Inventor:
Leonce Kraffe de Laubarede
By:
Emery, Holcombe & Blair
Attorneys

Patented Mar. 10, 1953

2,631,016

UNITED STATES PATENT OFFICE 2,631,016

HOMOGENIZING DEVICE FOR EXTRUDING MACHINES

Léonce Kraffe de Laubarede, Paris, France

Application July 10, 1950, Serial No. 172,826
In France July 15, 1949

12 Claims. (Cl. 259—6)

The object of this invention is to improve the quality of shaped objects obtained from thermoplastics by means of extruding machines and, in particular, extruded objects of very substantial section such as tubes of large diameter. It is known that great difficulties are experienced in ensuring a regular heating throughout the mass of such objects and in obtaining a material that is homogeneous and free from cold grains throughout its section; and to these difficulties is added the further one that the feeding of the delivery nozzle in the use of such machines is not absolutely regular but produces periodic variations in the dimensions of the extruded objects thereby obtained.

The invention also aims at improving the homogenizing of the material in the injecting machines used for the moulding of the plastic materials.

The subject of the invention is the new industrial product or machine of the nature of a homogenizing device adapted to be interposed at any suitable point in the circuit of the plastic material in an extruding machine or an injecting machine, this device being characterized by the fact that it comprises a casing having an inlet orifice and an outlet orifice for the material fed under pressure by any suitable device; and associated means including a certain number of parts for ensuring agitation of the material in the said casing, these parts being associated in pairs in any combination, the simplest of which comprises preferably:

(a) A first agitating part adapted to turn within the casing with the indispensable minimum of clearance, this part having the shape of a solid of revolution provided with circular grooves with helical gaps connecting them, the axis of the said part being in the general direction of the circulation of the plastic materials;

(b) A second part adapted to the internal shape of the casing and having projections engages in the circular grooves of the first part.

The device thus defined ensures perfect homogenizing of the material because it forces the latter to circulate simultaneously in the helical gaps and circular grooves of the movable member; furthermore, the material is agitated radially in those circular grooves and all its particles are uniformly heated by the heating device of any known kind which is generally arranged on the periphery of the casing. This homogenizing device has the advantage of not giving rise to any appreciable harmful counter-pressure, particularly if the helical gaps are of sufficient cross-section, have a great enough pitch and if the direction of rotation is such that the reaction of the helical gaps is used to force the material in the direction of its normal travel. On the other hand, the intense working transforms the mechanical energy which is expended into heat, which allows the heating to be moderated and, in certain particular cases, can even lead to elimination of that heating over the whole length of the homogenizer.

In a preferred embodiment of the homogenizing device in accordance with the invention, the second part which is engaged in the first rotary part, is substantially identical with the first and is likewise arranged so that it can turn without play in the casing and at the same speed, either in the same sense or in the opposite sense. It is also preferable to leave between the inter-engaged parts a greater lateral clearance on the entry side of the materials so the working is more intense in that region than on the exit side where a very small clearance is left so as to assist the lamination in the circular grooves of the already agitated material. It is to be understood that the depth and the number of the circular grooves and helical gaps can vary within wide limits and that the cross section of those grooves and gaps can vary from one end to the other of those rotary parts.

Finally, when a single rotary part is used, there may be engaged in the circular grooves of that part, one or preferably a number of combs, the teeth of which are engaged in those circular grooves either preferably over the whole length, or over only a part of the length; when there are several combs, these are disposed symmetrically around the rotary part in order to ensure an agitation as homogeneous as possible. In a general way, the play between the teeth of the combs and the grooves is decreased as the teeth come nearer to the exit for the material, always with the object of facilitating the lamination of that material in the terminal circular grooves.

Figure 2:
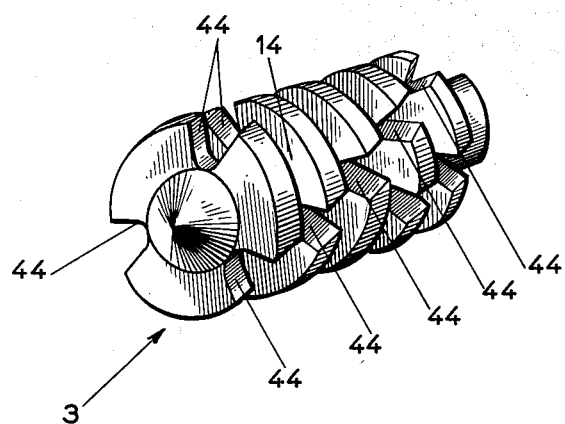
Figure 3:
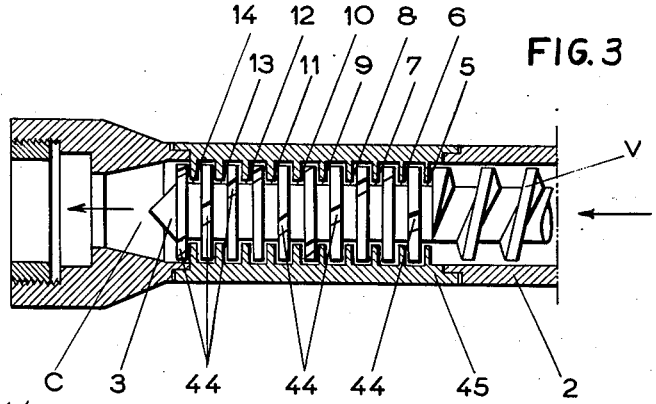
Figure 4:
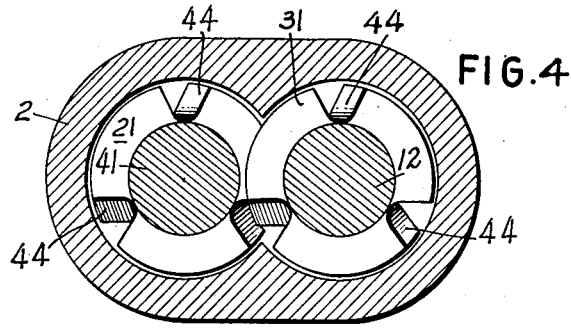

There will now be described by way of illustration and without limitation of the scope of the invention two preferred means for carrying the invention into effect as shown in the accompanying diagrammatic drawing, in which:

Figure 1 is a section taken along a plane of symmetry through a homogenizing device comprising two rotary agitating parts, Figure 2 is a perspective view of the end of a rotary agitating part seen from the exit side of the material, Figure 3 is an axial section through a homogenizing device comprising a single rotary part and two combs, and Figure 4 is a transverse cross-section taken along the line IV—IV of Figure 1, as seen from the left of the figure.

The homogenizing device 1 comprises a casing 2 which is formed by the extension of the casing of a device for feeding thermoplastics under pressure and comprising two screws of a known kind turning in the same sense or direction.

The agitation and the working of the plastic material are brought about by the rotation of two cooperating parts 3 and 4 both having the form of a solid of revolution, each of which is coaxial with a screw V with which it is integral and by which it is rotated when the extruding machine is in operation of which the assembly of parts shown in Figure 1 forms part and in which C represents the delivery compression chamber for the homogenised material.

The part 3 comprises circular grooves 5—6—7—8—9—10—11—12—13—14 from rear end to fore end, relatively to the direction of advance of the material as indicated by arrows in Figure 1; in these grooves are engaged respectively the circular ribs 15—16—17—18—19—20—21—22—23 and 24 of the part 4. Conversely the circular ribs 25—26—27—28—29—30—31—32—33—34 of the part 3 are engaged in the circular grooves 35—36—37—38—39—40—41—42—43 and on the cylindrical portion of the forward end of the part 4.

The clearance between the ribs and the corresponding grooves is much greater towards the rear end, for example in the case of the rib 15 in the groove 5 it is much more open or substantial than in the case of the rib 24 in the groove 14 which clearance is comparatively close.

The rotary parts 3 and 4 have, in each rib, three helical gaps 44 the pitch of which is oriented in the same direction as that of the screws V, but is much more elongated; for example, the pitch of the helical gaps 44 can advantageously be three times that of the screws V or even four times.

When the screws turn in the appropriate direction to ensure that the material is driven in the direction of the arrows the latter is driven into the helical gaps 44 and worked at the place where the parts 3 and 4 inter-engage; in the front portion of these two parts 3 and 4, that working becomes a real thinness or laminating having regard to the small amount of clearance provided between the respective projections of one part and the corresponding circular grooves of the other part.

A two-screw system V is illustrated for feeding the materials, but it is to be understood that any other pressure device could be used and that the parts 3 and 4 could be independent of that device; in which case it is sufficient simply to provide independent means for rotating the parts 3 and 4.

The device of Figure 3 comprises a single rotary part 3 with circular grooves 5—6—7—8—9—10—11—12—13 and 14 and helical gaps 44; two combs 45 have their teeth engaged in the circular grooves and the clearance provided for these teeth is smaller over the front part than over the rear part relatively to the direction of movement of the material as indicated by the arrows.

In the device of Figure 1 as in the device of Figure 3 the agitation and lamination of the material take place between the parts 3 and 4 or between the parts of the part 3 and the comb 45 which are inter-engaged.

The helical gaps 44 facilitate the circulation of the material and avoid a drop in pressure of the material between its entry into the homogenizing device on the side of the screws V and its exit into the chamber C.

It is of course understood that various changes, improvements or additions can be made to the embodiment described or that certain devices can be replaced by equivalent devices without thereby affecting the general economy of the invention.

In particular, homogenizing devices can be made which comprise a number of rotary devices forming pairs with their circular grooves and ribs inter-engaged; there can also be combined in one and the same casing a certain number of rotary parts such as have been defined and fixed parts cooperating in the working and laminating of the thermoplastic material in the circular grooves.

As has been indicated, the homogenizing device can be disposed at any suitable place along the path of the thermoplastic material; thus, the material can be brought to the entry to the homogenizing device under a reduced pressure and be taken up at the exit by a final compressing device before extrusion or injection.

What I claim is:

1. A machine for injecting or extruding plastic material comprising a homogenizer having an elongated casing portion with an inlet at one end for receiving plastic material and a delivery orifice at the other end, a rotatable agitating and feeding shaft disposed longitudinally of and within said casing portion, said shaft having a cylindrical surface provided with continuous annular grooves axially spaced along said shaft by rings bounded by said grooves and cylindrical surface and fitting closely in said casing, said rings being provided with peripherally disposed radial gaps providing communication between adjacent grooves and dividing said rings into segments terminating peripherally in substantial areas of said cylindrical surface, said segments being of greater circumferential length than said gaps, complementary means engaging in said grooves and conforming thereto in cross-sectional shape, and driving means for rotating said agitating and feeding shaft.

2. A machine as set forth in claim 1 having comparatively wide working clearances between said grooves and complementary means at the inlet end of said homogeniser said clearances narrowing toward the orifice end to facilitate homogeneity by gradual working of the plastic material.

3. A machine as set forth in claim 2 wherein the casing is provided with external heating means under control of the operator.

4. A machine as set forth in claim 1 having a plurality of similar grooved agitating and feeding means disposed in said casing with their axes parallel, said means inter-engaging along their adjacent grooved portions to work the plastic material as it is carried around circumferentially between them.

5. A machine as set forth in claim 4 wherein the gaps in the side walls of the grooves are equally spaced around the peripheries of the agitating and feeding means.

6. A machine as set forth in claim 5 wherein the gaps connecting successive grooves are disposed in helical paths in the direction of movement of the plastic material.

7. A machine as set forth in claim 1 having at least one stationary toothed member cooperating with said grooved agitating and feeding means, the shape of the teeth thereof being complementary to that of the grooves of said grooved means with a working clearance between said teeth and the walls of said grooves.

8. A machine as set forth in claim 7 having the working clearances between said grooved means and toothed member decreasing in width progressively toward the orifice end of the casing.

9. An agitating and feeding means for working plastic material in a homogenizer having a hollow casing, said agitating and feeding means having a surface of revolution adapted to fit within said casing with a minimum working clearance, said surface being provided with annular grooves axially spaced along said shaft by rings bounded by said grooves and surface of revolution, said rings being provided with peripherally disposed radial gaps providing communication between adjacent grooves and dividing said rings into segments terminating peripherally in substantial areas of said surface of revolution, said segments being of greater circumferential length than said gaps.

10. An agitating and feeding means as claimed in claim 9 in which said gaps extend in at least one helical line about said shaft and the walls of said gaps extend in the same direction as said line.

11. A plastic material extruding or injecting machine comprising a homogenizer having a casing portion with an inlet at one end for receiving plastic material and a delivery orifice at the other end, shaft-like agitating and feeding means axially disposed for rotation within said casing portion and having a periphery provided with encircling continuous grooves with side walls fitting closely in said casing, complementary means conforming to said grooves in cross-sectional shape and engaging therein so as to leave comparatively wide working clearances between said grooves and complementary means at the inlet end of said homogenizer, said clearances narrowing toward the orifice end to facilitate homogeneity by gradual working of the plastic material, said grooves communicating with each other through angularly disposed gaps in their side walls, and driving means for rotating said agitating and feeding means.

12. A machine as set forth in claim 11 wherein the casing is provided with external heating means under control of the operator.

LÉONCE KRAFFE DE LAUBAREDE.

REFERENCES CITED

The following references are of record in the file of this patent:

UNITED STATES PATENTS

| Number | Name | Date |
|---|---|---|
| 1,487,208 | Cooke et al. | Mar. 18, 1924 |
| 1,958,020 | Robinson | May 8, 1934 |
| 1,980,589 | Acree | Nov. 13, 1934 |

FOREIGN PATENTS

| Number | Country | Date |
|---|---|---|
| 59,084 | Netherlands | Oct. 20, 1944 |